(12) United States Patent
Allan et al.

(10) Patent No.: US 9,140,543 B1
(45) Date of Patent: Sep. 22, 2015

(54) SYSTEMS AND METHODS FOR MEASURING THE STRESS PROFILE OF ION-EXCHANGED GLASS

(75) Inventors: Douglas Clippinger Allan, Corning, NY (US); Karl William Koch, III, Elmira, NY (US); Rostislav Vatchev Roussev, Painted Post, NY (US); Robert Anthony Schaut, Painted Post, NY (US); Vitor Marino Schneider, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 666 days.

(21) Appl. No.: 13/463,322

(22) Filed: May 3, 2012

Related U.S. Application Data

(60) Provisional application No. 61/489,800, filed on May 25, 2011.

(51) Int. Cl.
   *G06F 19/00* (2011.01)
   *G01L 1/24* (2006.01)
   *G01B 11/16* (2006.01)

(52) U.S. Cl.
   CPC .................................... *G01B 11/16* (2013.01)

(58) Field of Classification Search
   CPC .......... G01B 11/16; G01L 1/24; G01M 11/30
   USPC ............... 702/42, 159; 356/32, 364; 65/30.14
   See application file for complete search history.

(56) References Cited

U.S. PATENT DOCUMENTS 6,516,634 B1 * 2/2003 Green et al. ................. 65/30.14

FOREIGN PATENT DOCUMENTS

JP          11281501 A      10/1999 ................ G01L 1/00

OTHER PUBLICATIONS

R. Oven et al; "Use of multiple wavelength and/or TE/TM effective-refractive-index measurements to reconstruct refractive-index profiles"; IEE Proc.—Optoelectronics; vol. 144; No. 4; Aug. 1997; p. 213-219.
N. Valles-Villarreal et al; "Stress in Copper Ion-Exchanged Glass Waveguides"; Journal of Lightwave Technology; vol. 17; No. 4; Apr. 1990; p. 606-612.
J. M. White et al; "Optical Waveguide Refractive Index Profiles Determined from Measurement of Mode Indices: A Simple Analysis"; Applied Optics; Jan. 1976; vol. 15; No. 1; p. 151-155.
Yong Yang et al; "Improved Method for Recovering Graded-Index Profile of Isotropic Waveguide by Cubic Spline Function"; Optical Engineering 49(7); p. 074602-1/074602-5; (Jul. 2010).
Haidong Zhu et al; "Construction of the Refractive Index Profiles for Few-Mode Planar Optical Waveguides"; Science Direct; Optics Communications 260 (2006) p. 542-547.
V.V. Zhurikhina et al; "Ion-Exchange Characteristics of Sodium-Calcium-Silicate Glass: Calculation from Mode Spectra"; ISSN; Technical Physics; 2010; vol. 55; No. 10; p. 1447-1452.

* cited by examiner

*Primary Examiner* — John H Le
(74) *Attorney, Agent, or Firm* — Timothy M Schaeberle; Robert P Santandrea

(57) ABSTRACT

Systems and methods for measuring the stress profile of ion-exchanged glass are disclosed, based on the TM and TE guided mode spectra of the optical waveguide formed in the ion-exchanged glass. The method includes digitally defining from the TM and TE guided mode spectra positions of intensity extrema, and calculating respective TM and TE effective refractive indices from these positions. The method also includes calculating TM and TE refractive index profiles $n_{TM}(z)$ and $n_{TE}(z)$ using either an inverse WKB calculation or a fitting process that employs assumed functions for $n_{TM}(z)$ and $n_{TE}(z)$. The method also includes calculating the stress profile $S(z)=[n_{TM}(z)-n_{TE}(z)]/SOC$, where SOC is a stress optic coefficient for the glass substrate. Systems for performing the method are also disclosed.

16 Claims, 16 Drawing Sheets

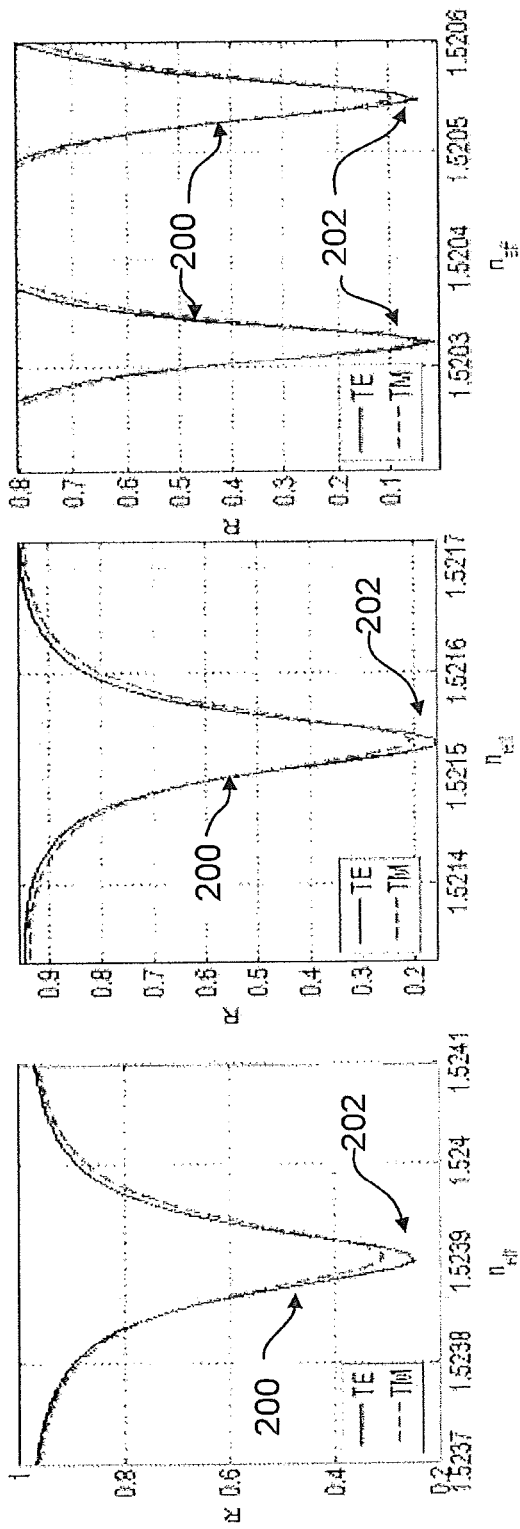

SYSTEMS AND METHODS FOR MEASURING THE STRESS PROFILE OF ION-EXCHANGED GLASS

CROSS-REFERENCE TO RELATED APPLICATIONS

This application claims the benefit of priority under 35 U.S.C. §119 of U.S. Provisional Application Ser. No. 61/489,800 filed on May 25, 2011, the content of which is relied upon and incorporated herein by reference in its entirety.

FIELD

The present disclosure relates generally to ion-exchanged glass, and in particular to systems and methods for measuring the stress profile of ion-exchanged glass

BACKGROUND

Ion exchange is used in the glass industry to change the properties of a bulk glass substrate to create, for example, optical waveguides or to increase the strength of the glass. For example, Corning's GORILLA® glass comprises an aluminosilicate bulk glass where potassium ions are exchanged for sodium ions in a surface layer using a diffusion process. The diffusion process is carried out using, for example, an aluminosilicate glass substrate immersed in a potassium salt bath that is maintained at an elevated temperature.

Because the potassium ions are larger than the sodium ions, a compressive stress arises in the ion-exchange region of the aluminosilicate substrate. This compressive stress serves to strengthen the glass, thereby making GORILLA® glass and related ion-exchanged glasses useful for a host of applications requiring a strong glass with scratch-resistant surface. Example applications include flat-panel cover glass for laptop computers, televisions and hand-held displays.

The strength of an ion-exchanged glass is largely defined by its stress profile, which is a measure of the induced stress as a function of distance into the glass from the glass surface. Unfortunately, present-day non-destructive and efficient stress measurement techniques only provide a surface stress measurement or a crude linear approximation for the stress profile, and such measurements have limited utility. When manufacturing an ion-exchanged glass, a non-destructive measurement of the full stress profile, or a more accurate representation of it than the linear approximation, can provide a more complete understanding of how process conditions lead to particular stress profile, and how the different stress profiles correlate with glass strength and frangibility. Such measurement capability could improve and accelerate the development of new and improved ion-exchanged glasses and ion exchange processing.

SUMMARY

An aspect of the disclosure is a method of measuring a stress profile of an ion-exchanged glass substrate based on TM and TE guided mode spectra from an optical waveguide defined in part by an ion-exchange region. The method includes digitally defining from the TM and TE guided mode spectra respective TM and TE intensity profiles corresponding to TM and TE guided modes. The method also includes determining positions of intensity extrema of the TM and TE intensity profiles, and calculating respective TM and TE effective refractive indices from the positions. The method further includes calculating TM and TE refractive index profiles $n_{TM}(z)$ and $n_{TE}(z)$ using the calculated effective refractive indices. This can be done by performing an inverse WKB calculation based on the TM and TE effective refractive indices. This can also be done by fitting calculated guided mode spectra to the TM and TE guided mode spectra using one or more respective assumed functions for $n_{TM}(z)$ and $n_{TE}(z)$. The method then includes calculating the stress profile $S(z)=[n_{TM}(z)-n_{TE}(z)]/SOC$, where SOC is a stress optic coefficient for the glass substrate.

Another aspect of the disclosure is a method of measuring a stress profile formed in an ion-exchanged glass substrate having a surface and a stress optic coefficient SOC. The method includes digitally capturing TM and TE guided mode spectra of an optical waveguide defined by the ion-exchanged glass substrate. The method then includes determining positions of intensity extrema of the TM and TE guided mode spectra, and calculating respective TM and TE effective refractive indices from the positions. The method also includes calculating TM and TE refractive index profiles $n_{TM}(z)$ and $n_{TE}(z)$ from the effective refractive indices. This calculation can be performed using one of two approaches. The first approach includes performing an inverse WKB calculation based on TM and TE effective refractive indices, respectively. The second approach includes fitting calculated guided mode spectra to the TM and TE guided mode spectra using one or more assumed functions for $n_{TM}(z)$ and $n_{TE}(z)$. The method further includes calculating the stress profile $S(z)=[n_{TM}(z)-n_{TE}(z)]/SOC$.

Another aspect of the disclosure is a system for measuring a stress profile of an ion-exchanged glass substrate having a surface, a stress optic coefficient and an ion-exchange region that in part defines an optical waveguide. The system includes a photodetector array configured to detect light representative of TM and TE guided mode spectra of the optical waveguide and form therefrom a digital representation of the TM and TE guided mode spectra. The system also includes a controller configured to receive the digital representation of the TM and TE guided mode spectra, the controller having instructions stored in a computer-readable medium that cause the controller to carry out the following calculation: a) determine positions of intensity extrema in the TM and TE guided mode spectra; b) calculate respective TM and TE effective refractive indices from the positions; c) calculate, from the TM and TE effective refractive indices, TM and TE refractive index profiles $n_{TM}(z)$ and $n_{TE}(z)$, where z is a distance from the substrate surface, either by performing an inverse WKB calculation or by fitting calculated guided mode spectra to the TM and TE guided mode spectra using one or more assumed functions for $n_{TM}(z)$ and $n_{TE}(z)$; and d) calculate the stress profile $S(z)=[n_{TM}(z)-n_{TE}(z)]/SOC$.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various exemplary embodiments of the disclosure, and together with the description serve to explain the principles and operations of the disclosure. The claims are incorporated into and constitute part of this specification.

BRIEF DESCRIPTION OF THE DRAWINGS

FIG. 7A through FIG. 7C are close-up plots of reflectivity R vs. $n_{eff}$ for the first guided mode (FIG. 7A), the fifth guided mode (FIG. 7B), and the eighth and ninth guided modes (FIG. 7C) of the plot of FIG. 6B, showing in more detail the intensity dips associated with the corresponding guided mode lines in the TM and TE guided mode spectra;

DETAILED DESCRIPTION

Figure 1:
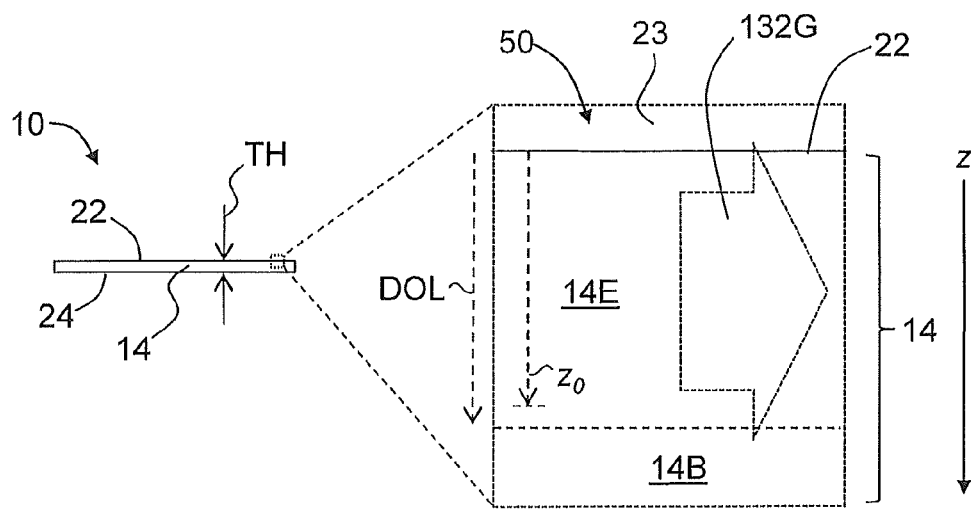
FIG. 1 is a side view of an example ion-exchanged glass substrate.

Reference is now made in detail to embodiments of the disclosure, examples of which are illustrated in the accompanying drawings. Whenever possible, like or similar reference numerals or symbols are used throughout the drawings to refer to like or similar parts. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein.

FIG. 1 is a side-view of an example ion-exchanged glass substrate 10. Ion-exchanged glass substrate 10 has a glass body 14 that defines a substantially planar upper surface 22 and an opposite substantially planar lower surface 24 that is generally parallel to the upper surface. The thickness TH of the glass body 14 is substantially uniform. In an example, upper surface ("surface") 22 interfaces with an air or liquid (e.g., index-matching-fluid) environment 23.

The inset of FIG. 1 is a close-up view of a portion of glass body 14 that includes surface 22. Glass body 14 includes an ion-exchange region 14E that extends from surface 22 in the z-direction to a diffusion depth of layer DOL within the glass body. In an example, a substantially similar or identical second ion-exchange region 14E (not shown) extends into the glass body from lower surface 24. In an example, the depth DOL generally corresponds to where the ion-exchange region 14E terminates, i.e., where the bulk-glass region 14B, which remains chemically unaffected by the ion diffusion, begins. In another example, the DOL corresponds to a depth where the local change in concentration of the in-diffused species produced by the ion exchange is 100 times smaller than the local change of concentration of the in-diffused species at the upper surface 22.

Another important parameter associated with ion-exchanged glass substrate 10 is the case depth $z_0$, which is defined as the location where the stress changes from compressive to tensile, i.e., where stress passes through zero. In an example, the case depth $z_0$ is defined as the distance from glass substrate upper surface 22 to the depth where the stress induced by the ion-exchange changes sign or becomes zero. An aspect of the systems and methods disclosed herein is to measure the case depth $z_0$ and distinguish it from the diffusion depth of layer DOL. The case depth $z_0$ depends on the sample thickness through force balance while the diffusion depth of layer DOL generally does not.

Figure 2:
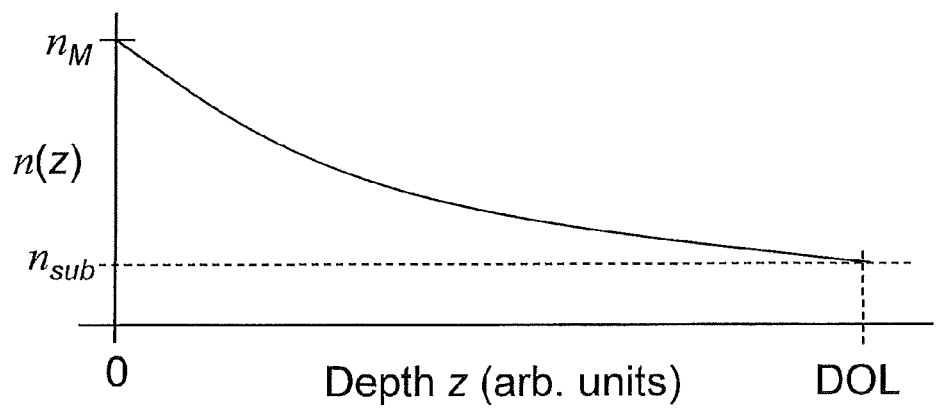
FIG. 2 is a schematic plot of the refractive index profile n(z) as a function of the distance z into the glass substrate from the glass upper surface.

The ion-exchange process results in a refractive index profile n(z), as schematically illustrated in the plot of refractive index n(z) vs. z of FIG. 2. In the plot, bulk-glass region 14B has a refractive index of $n_{sub}$, while the ion-exchange region 14E has a maximum refractive index $n_M$ at glass substrate upper surface 22. An example diffusion depth of layer DOL is in the range from about 50 microns up to about 100 microns.

An example thickness TH for ion-exchanged glass substrate 10 is between 0.7 mm and 2 mm. An example material for ion-exchanged glass substrate 10 is sodium-containing aluminosilicate glass, and a typical ion for the ion-exchange process is potassium.

The air or liquid environment 23 that resides above substrate upper surface 22, the ion-exchange region 14E and the bulk-glass region 14B define an optical waveguide 50. Optical waveguide 50 supports one or more guided modes in which light 132G can propagate. The guided modes are defined by the particular configuration and dimensions of optical waveguide structure, including the refractive index profile n(z).

Figure 3A:
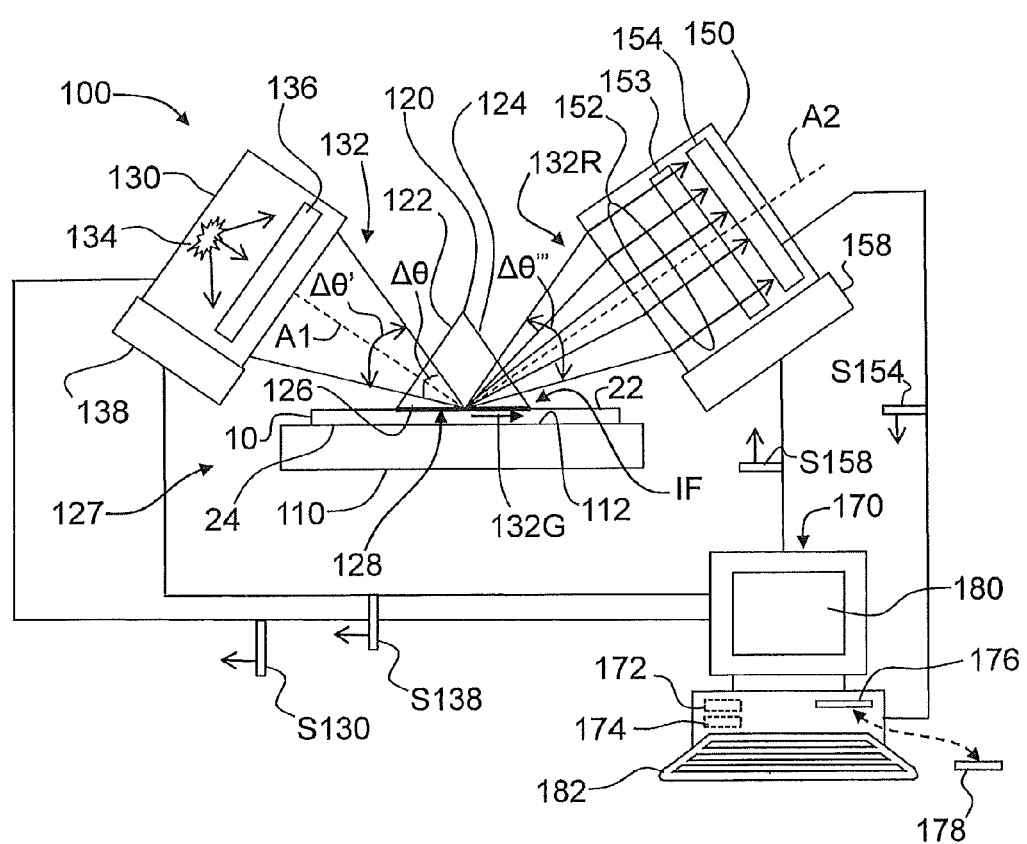
FIG. 3A is a schematic diagram of an example stress-profile measurement system used to carry out the methods of the disclosure.

FIG. 3A is a schematic diagram of an example stress-profile measurement system ("system") 100 according to the disclosure. System 100 includes a support member 110 having a surface 112 configured to support ion-exchanged glass substrate 10 so that lower surface 24 of the ion-exchanged glass substrate contacts support member surface 112. System 100 includes a coupling prism 120 interfaced with ion-exchanged glass substrate 10 at substrate upper surface 22. Surface 112 or the surface 24 may be blackened to prevent or reduce reflection from interface region of surfaces 24 and 112 back toward substrate upper surface 22. Support member 110, ion-exchanged glass substrate 10 and coupling prism 120 constitute a prism coupler assembly 127.

Figure 3B:
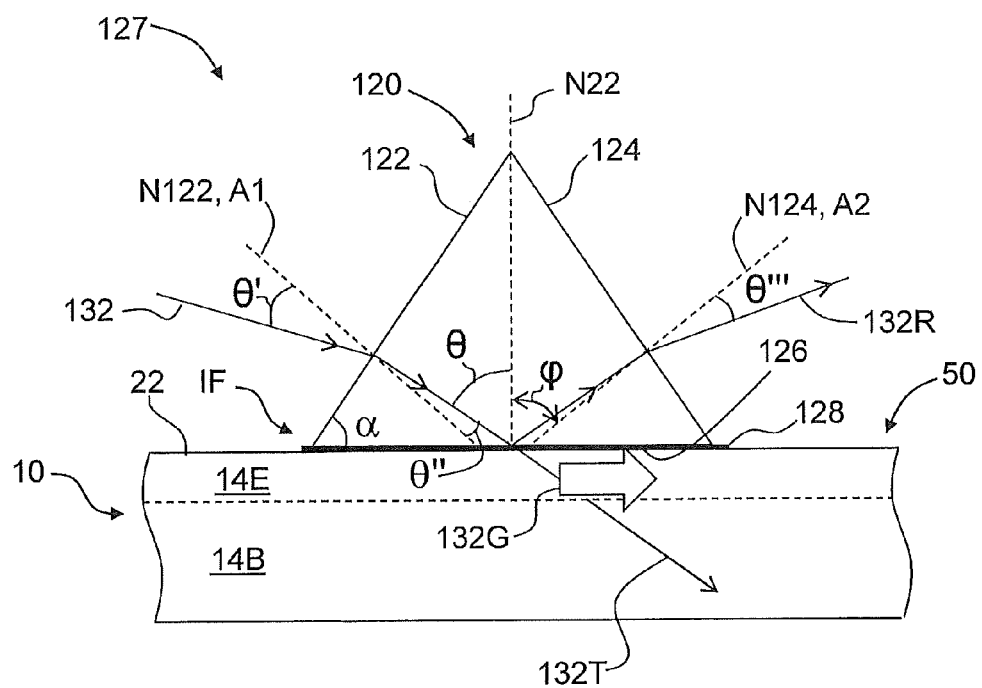
FIG. 3B is a close-up side view of the interfaced prism and glass substrate within the stress-profile measurement system of FIG. 3A.

FIG. 3B is a close-up side view of an example prism coupler assembly 127. Coupling prism 120 has a corner angle $\alpha$, an input surface 122 with a surface normal N122, an output surface 124 with a surface normal N124, and a coupling surface 126. Coupling surface 126 is arranged in optical contact with upper surface 22 of ion-exchanged glass substrate 10 and defines a prism-waveguide interface IF. In an example, a thin layer of index-matching fluid 128 (e.g., index-matching oil) having a refractive index $n_F$ is used to establish or otherwise enhance the optical contact and constitutes part of the prism-waveguide interface IF. Coupling prism 120 has a refractive index $n_P$ that is greater than the bulk-glass region ("substrate") refractive index $n_{sub}$. Index-matching fluid 128 has a refractive index between the substrate refractive index $n_{sub}$ and the prism refractive index $n_P$. In an example, coupling prism 120 has its two base corner angles equal to $\alpha$, while in another example has all three angles equal to $\alpha$.

Figure 3C:
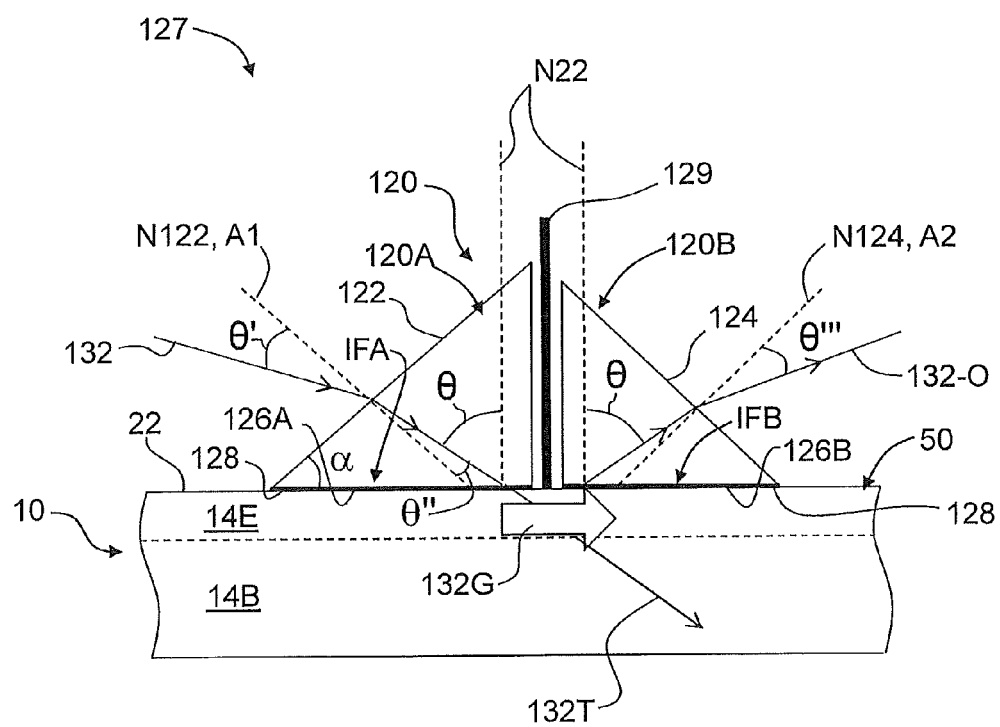
FIG. 3C is similar to FIG. 3B, and illustrates an example embodiment where the coupling prism is a split prism that serves to block the reflection of light from the prism-substrate interface region, and gives rise to the bright-line mode spectra of FIG. 5A.

FIG. 3C is a close-up side view of an example prism coupler assembly 127 similar to that of FIG. 3B, but where the coupling prism is a split prism 120 having two prism sections 120A and 120B. Prism section 120A has an input surface 122 with a surface normal N122, while prism section 120B has an output surface 124 with a surface normal N124. Prism sections 120A and 120B have respective coupling surfaces 126A and 126B. Prism sections 120A and 120B define respective first and second prism-waveguide interfaces IFA and IFB. A light-blocking member 129 is optionally included between prism sections 120A and 120B to prevent reflected light (not shown) from prism-waveguide interface IFA from reaching prism section 120B.

In the operation of the prism coupler assembly 127 illustrated in FIG. 3C, light 132 from light source unit 130 is coupled into optical waveguide 50 through prism section 120A at prism-waveguide interface IFA to form guided light 132G. This guided light is then coupled out of optical waveguide 50 some distance away through prism-waveguide interface IFB of prism section 120B, to form out-coupled light 132-O. Out-coupled light 132-O gives rise to the intensity pattern shown in image IM of FIG. 5B, discussed below.

With reference again to FIG. 3A, system 100 includes a light source unit 130 that has an optical axis A1. In an example, light source unit 130 emits light 132 in the form of a beam having a range $\Delta\theta'$ of angles $\theta'$, with light beam 132 illuminating the prism-substrate interface IF through coupling prism 120.

In an example, each point on the area of the prism-substrate interface IF is illuminated by light source unit 130 through angular range $\Delta\theta$ comprising light beam 132 (in FIG. 3A, refraction of light 132 by prism 120 is ignored for ease of illustration). Disregarding all other points on the prism-substrate interface IF, the illumination of the given point on the prism-substrate interface IF can be considered a convergent input light beam 132 directed generally along optical axis A1. Such a convergent input light beam 132 can include both TE and TM polarizations, and has an initial angular spread of $\Delta\theta'$ of angles $\theta'$ centered around optical axis A1. This angular spread becomes $\Delta\theta$ within coupling prism 120 due to refraction at prism input surface 122.

In an example, optical axis A1 is co-axial with a surface normal N122 of prism input surface 122. In an example, light source unit 130 includes a light source 134 and an optical element 136. In an example, light source 134 comprises a narrow-band light source and optical element 136 comprises a diffuser. Example narrow-band light source 134 includes but is not limited to a light-emitting diode (LED), a sodium-vapor lamp, or a diverging laser beam such as some semiconductor lasers or tightly focused lasers. An advantage of having input light beam 132 with an initial angular spread $\Delta\theta'$ is that it can simultaneously excite multiple guided modes of optical waveguide 50.

In an example, light source unit 130 includes a stage 138 configured to be automatically or manually movable so that optical axis A1 can have different angles relative to surface normal N22 of substrate surface 22. This allows for a relatively wide range of input angles $\theta$ for input light beam 132 (see FIG. 2). In this example, light beam 132 can be very narrow, i.e., can have a relatively small initial angular spread $\Delta\theta'$. In one example, the angular spread may be only slightly wider than the angular spread of the mode spectrum of the optical waveguide 50, and movable stages 138 and 158 can be used to align the two angular spreads to overlap each other. In another example, $\Delta\theta'$ may be smaller than the angular spread of the mode spectrum, and stages 138 and 158 can be used to align the input beam to couple into one particular mode or a sub-group of modes.

System 100 also includes a photodetector unit 150 configured to receive and detect light 132R that reflects from interface IF and exits prism output surface 124. Photodetector unit 150 includes along axis A2 a collection optical system 152, a polarizer unit 153 and a photodetector array 154. In an example, photodetector array 154 comprises a CCD camera. In an example, collection optical system 152 collects reflected light 132R that reflects from different positions on the prism-substrate interface IF at different propagation angles $\theta'''$ (i.e., over the range $\Delta\theta'''$ of angles $\theta'''$) and converts these propagation angles to positions or lines on photodetector array 154. Note that in the case where coupling prism 120 is isosceles, the symmetry of the prism-coupling configuration results in $\theta'=\theta'''$.

Also in an example, photodetector unit 150 includes a stage 158 configured to be automatically or manually movable so that optical axis A2 can have different angles $\varphi$ relative to surface normal N22 of substrate surface 22 (see FIG. 3B). This allows for detecting the mode spectrum over a relatively large angular range $\Delta\theta'''$.

System 100 further includes a controller 170 that includes a processor 172 and a memory 174. Controller 170 is configured to control the operation of system 100. In an example, processor 172 is configured to perform image processing on raw images IM (FIG. 5A) from photodetector array 154. In an example embodiment, controller 170 is or includes a computer with a processor and includes an operating system such as Microsoft WINDOWS or LINUX.

In an example embodiment, processor 172 is or includes any processor or device capable of executing a series of software instructions and includes, without limitation, a general- or special-purpose microprocessor, finite state machine, controller, computer, central-processing unit (CPU), field-programmable gate array (FPGA), or digital signal processor. In an example embodiment, the processor is an Intel XEON or PENTIUM processor, or an AMD TURION or other in the line of such processors made by AMD Corp., Intel Corp. or other semiconductor processor manufacturer.

Memory 174 is operably coupled to processor 172. As used herein, the term "memory" refers to any processor-readable medium, including but not limited to RAM, ROM, EPROM, PROM, EEPROM, disk, floppy disk, hard disk, CD-ROM, DVD, or the like, on which may be stored a series of instructions executable by processor 172. In an example embodiment, controller 170 includes a disk drive 176 adapted to accommodate a removable processor-readable medium 178, such as CD-ROM, DVE, memory stick or like storage medium.

The methods of determining the stress profile and related properties of ion-exchanged glass substrate 10, including the operation of system 100, may be implemented in various embodiments in a machine-readable medium (e.g., memory 174) comprising machine-readable instructions (e.g., computer programs and/or software modules) for causing controller 170 to perform the methods and the controlling operations for operating the system. In an example embodiment, the computer programs run on processor 172 out of memory 174, and may be transferred to main memory from permanent storage via disk drive 176 when stored on removable media 178, or via a network connection or modem connection when stored outside of controller 170, or via other types of computer or machine-readable media from which it can be read and utilized.

The computer programs and/or software modules may comprise multiple modules or objects to perform the various methods disclosed herein, and control the operation and function of the various components in system 100. The type of computer programming languages used for the code may vary between procedural code-type languages to object-oriented languages. The files or objects need not have a one-to-one correspondence to the modules or method steps described depending on the desires of the programmer. Further, a combination of software, hardware and firmware may be employed. Firmware can be downloaded into processor 172 for implementing the various example embodiments of the systems and methods disclosed herein.

Controller 170 also optionally includes a display 180 that can be used to display information using a wide variety of alphanumeric and graphical representations. For example, display 180 is useful for displaying the processed images of the TM and TE mode spectrums, the TM and TE refractive index profiles, the stress profile S(z) as well as other stress-related parameters. Controller 170 also optionally includes a data-entry device 182, such as a keyboard, that allows a user of system 100 to input information into controller 170 (e.g., the type of ion-exchanged glass substrate being measured, when it was fabricated, fabrication conditions, etc.), and to manually control the operation of system 100.

In an example, controller 170 includes mathematical computing software such as MATLAB® mathematical computing software, available from Mathworks®, Inc., Natick, Mass.

System Operation

With continuing reference to FIG. 3A, in an example of the operation of system 100, controller 170 activates light source unit 130 via a control signal S130 to generate an input light beam 132. The input light beam 132 passes through prism input surface 122 and different parts of it converge on different corresponding positions on the prism-waveguide interface IF. In an example where light source unit 130 acts as an extended light source (e.g., includes a narrow-band light source 134 and a light-diffusing optical element 136), the position on the prism-waveguide interface IF can be considered a differential area element that sees a convergent beam that subtends an angular range $\Delta\theta'$, as described above.

Because input light beam 132 refracts at prism input surface 122 for incident angles $\theta'$ other than normal, input light beam 132 is incident upon prism coupling surface 126 at an angle $\theta$ as measured relative to a surface normal N22 of glass substrate surface 22 (see FIG. 3B) The angles $\theta'$ and $\theta$ are related via Snell's law and the angle rules:

$$n_P \sin\theta'' = \sin\theta', \tag{1}$$

$$\theta = \alpha + \theta'' = \alpha + \sin^{-1}\left(\frac{\sin\theta'}{n_P}\right) \tag{2}$$

where $n_P$ is the prism refractive index and $\sin^{-1}$ signifies the inverse sine function (arcsine). In an example, controller 170 provides control signals S138 and S158 to stages 138 and 158 to cause these stages to move into select relative positions for illumination and light detection, respectively.

A fraction of input light beam 132 is reflected from prism-waveguide interface IF to form reflected light 132R, while the remaining fraction of input light beam 132 is coupled through the prism-waveguide interface IF and into waveguide 50 to form guided light 132G. Generally speaking, guided light 132G travels in the one or more guided modes, unless the angle $\theta$ is smaller than the critical angle $\theta_C$, in which case all transmitted light is coupled to radiation modes of ion-exchanged substrate 10 and leaky modes of the waveguide 50. The fraction of light beam 132 reflected from prism-waveguide interface IF is determined in part by the particular angle of incidence $\theta'$, and its relationship to the propagation constants of the guided and radiation modes of optical waveguide 50. In particular, significant coupling into guided modes and corresponding reduction in reflected light may be observed at angles $\theta$ in the vicinity of values $\theta_i = \sin^{-1}(n_{\mathit{eff},i}/n_P)$, where $n_{\mathit{eff},i}$ is the effective index of the i-th guided mode of waveguide 50.

Photodetector unit 150 receives divergent reflected light 132R at collection optical system 152, which collimates this reflected light. The collimated reflected light 132R passes through polarizer unit 153 and is detected by photodetector array 154. Photodetector array 154 then generates an electrical image signal S154 representative of the initial or raw image IM formed by the detected reflected light 132R. Electrical image signal S154 is then received by controller 170, which in example stores the recorded raw or initial image IM in memory 174 for subsequent processing by processor 172.

Alternatively, electrical image signal S154 can be sent directly to processor 172 for processing. The various options for processing of raw or initial image IM are discussed in greater detail below.

Figure 4:
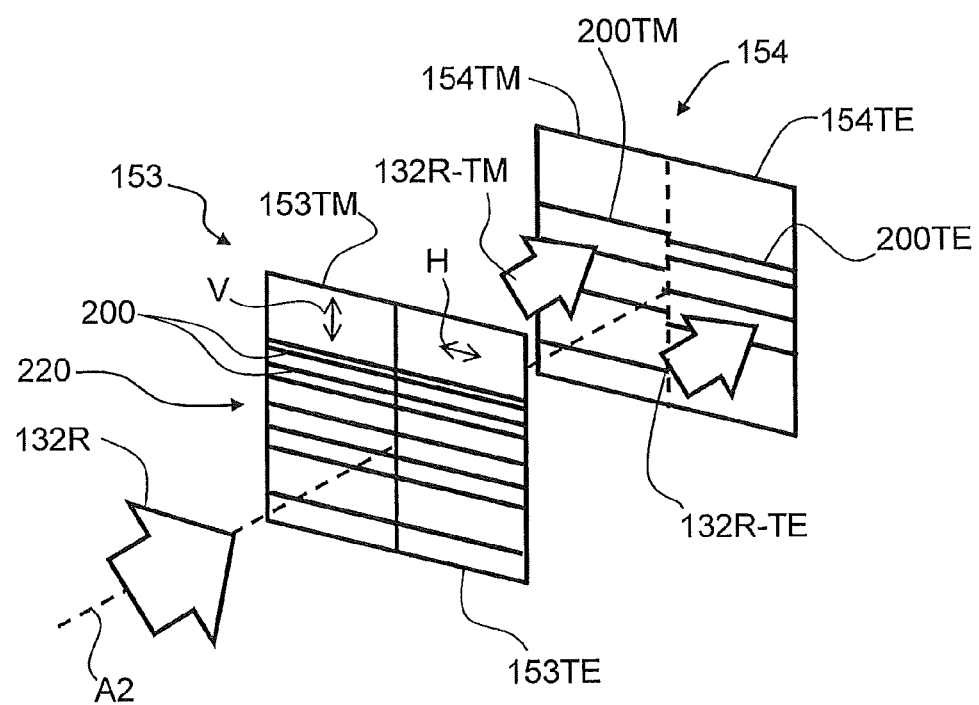
FIG. 4 is a schematic diagram of a portion of the photodetector unit illustrating an example configuration for the polarizer unit and the photodetector array.

FIG. 4 is a schematic diagram of a portion of photodetector unit 150 illustrating an example configuration for polarizer unit 153 and photodetector array 154. Polarizer unit 153 includes first and second polarizers 153TM and 153TE arranged side-by-side and having respective orthogonal polarizations denoted by arrows V (vertical) and H (horizontal). Polarizers 153TM and 153TE serve to define respective regions 154TM and 154TE of photodetector array 154 for detecting TM reflected light 132R-TM and TE reflected light 132R-TE. Also shown in FIG. 4 are mode lines 200 formed by reflected light 132R. The mode lines 200 represent reduction of reflected light 132R due to portions of input light beam 132 being coupled into the guided modes of waveguide 50 as guided light 132G. Thus, mode lines 200 represent the mode spectrum 220 for waveguide 50.

Reflected light 132R, which in an example includes both TM and TE reflected light components 132R-TM and 132R-TE, is incident upon both polarizers 153TM and 153TE. The TM reflected light 132R-TM is passed by TM polarizer 153TM and is received by TM photodetector array region 154TM. Likewise, TE reflected light 132R-TE is passed by TE polarizer 153TE and is received by TE photodetector array region 154TE. Shown on photodetector array 154 are TM mode lines 200TM on TM photodetector array region 154TM, and TE mode lines 200TE on TE photodetector array region 154TE. In response, photodetector array 154 generates the aforementioned image signal S154, which is representative of the raw or initial image IM captured by the TM and TE photodetector array regions 154TM and 154TE.

Figure 5A:
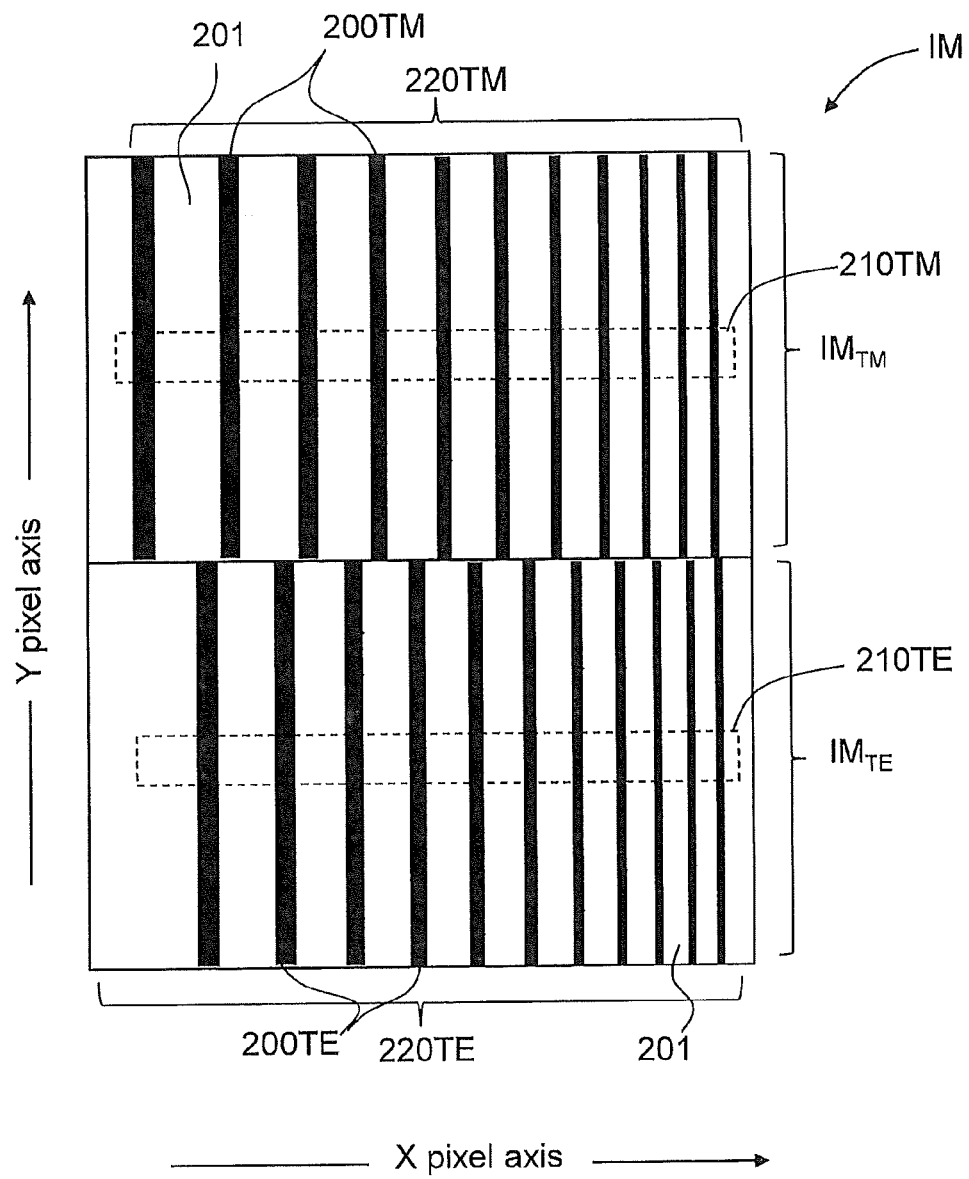
FIG. 5A is a schematic depiction of an example image formed by light reflected by the prism-substrate interface region and captured by the photodetector array of the photodetector unit, with the image showing the TM and TE mode spectra with dark mode lines (i.e. intensity dips)

FIG. 5A is a schematic depiction of an example raw or initial image IM formed by reflected light 132R and captured by photodetector array 154 of photodetector unit 150. The X and Y pixel axes are shown. Raw or initial image IM includes two regions: a TM region $IM_{TM}$ and a TE region $IM_{TE}$, which correspond to respective regions 154TM and 154TE of photodetector array 154 associated with TM polarizer 153TM and TE polarizer 153TE. Mode lines 200TM and 200TE are shown in respective TM image region $IM_{TM}$ and TE image region $IM_{TE}$. Raw or initial image IM is a digital representation of the TM and TE mode spectra 220TM and 220TE for waveguide 50 so that reflected light 132 is representative of the TM and TE mode spectra.

Figure 5B:
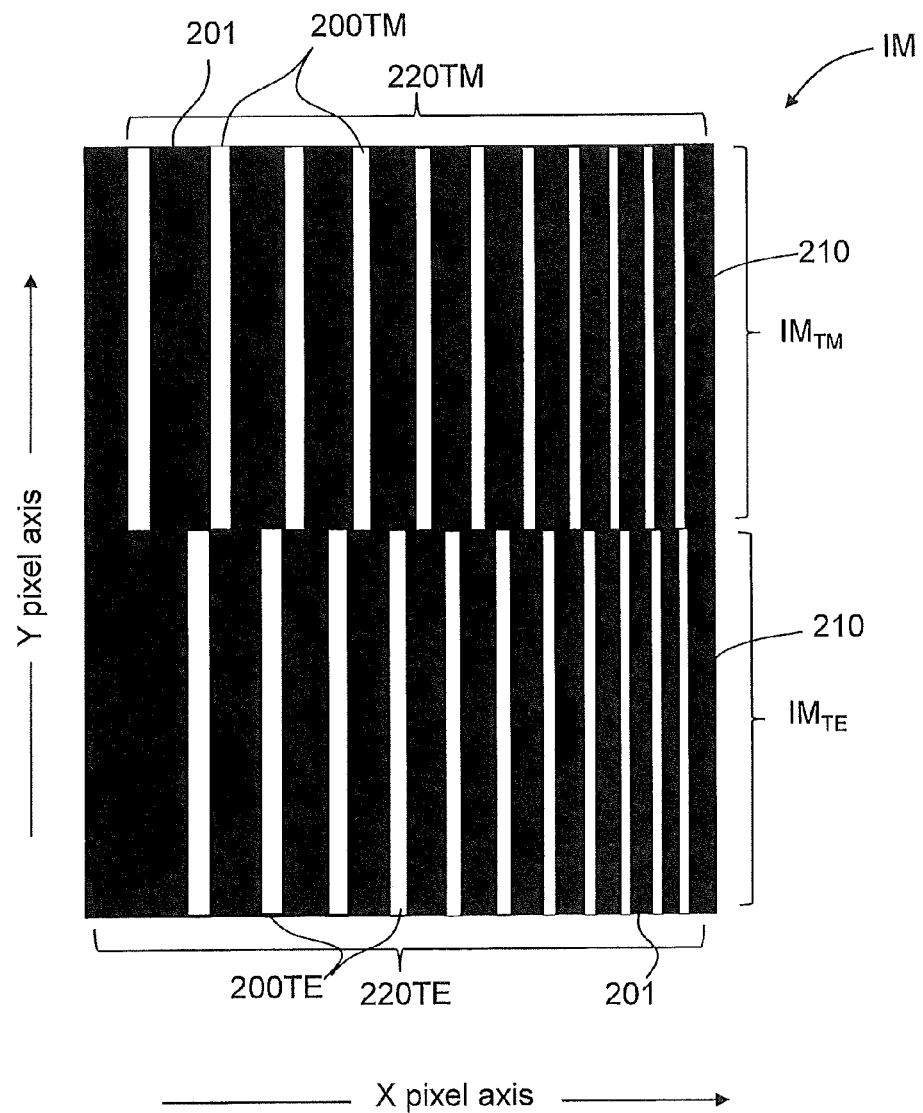
FIG. 5B is similar to FIG. 5A, but showing the TM and TE mode spectra with bright mode lines (i.e. intensity peaks), such as formed using the split-prism configuration of FIG. 3C.

FIG. 5B is similar to FIG. 5A, but the TM and TE mode spectra have mode lines 200TM and 200TE with intensity peaks rather than intensity dips. This representation of the TM and TE mode spectra can be obtained, for example, by reversing the contrast in the raw or initial image IM of FIG. 5A. It can also be obtained by using the prism-coupling configuration illustrated in FIG. 3C, whose operation is discussed above. The example embodiments described herein are generally based on detecting reflected light 132R using the prism-coupling configuration of FIG. 3A by way of example. The methods described herein with respect to the mode spectra of FIG. 5A apply in analogous fashion to the mode spectra of FIG. 5B.

Figure 6A:
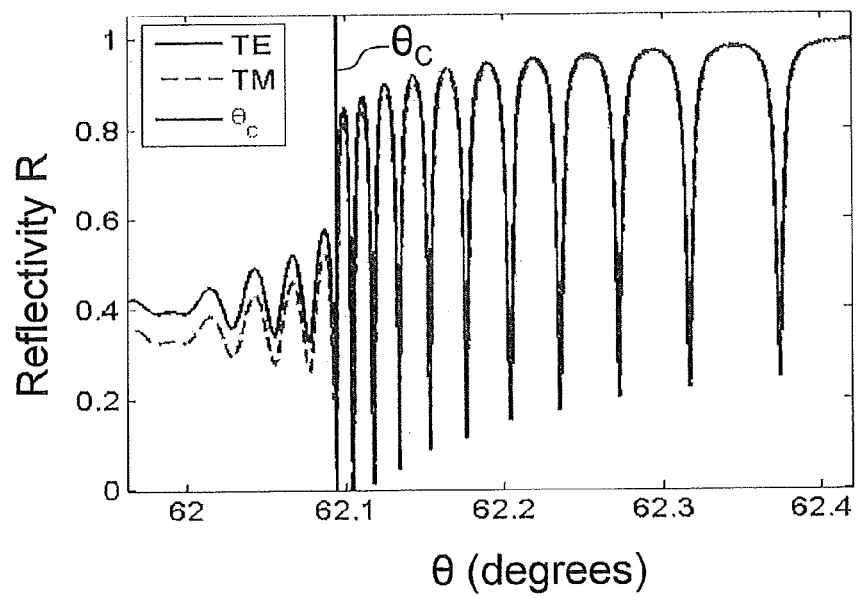
FIG. 6A is a plot of the calculated reflection R from the prism-waveguide interface as a function of incidence angle θ within the coupling prism for a hypothetical ion-exchanged glass substrate.

The TM and TE mode lines 200TM and 200TE of FIG. 5A and FIG. 5B are shown as idealized, black-and-white intensity dips and peaks, respectively. In practice, they represent intensity changes that have respective minima or maxima (hereinafter, "extrema") whose positions need to be precisely established. FIG. 6A is a plot of the calculated reflection R from the prism-waveguide interface IF as a function of incidence angle θ within coupling prism 120 for a hypothetical ion-exchanged glass substrate 10. The calculated reflection R corresponds to an intensity profile of the raw or initial image IM captured by photodetector array 154. In arriving at the plot of FIG. 6A, ion-exchange region 14E was assumed to have no birefringence. The critical angle $\theta_C$ for total internal reflection within prism 120 was calculated based on a coupling prism refractive index $n_P$=1.72 and substrate bulk-glass refractive index of $n_{sub}$=1.52, and is represented by the vertical straight line. The calculation used an index-matching fluid 128 having a refractive index $n_F$=1.62. The reflected intensity was separately calculated for each polarization and plotted on the same graph. Coupling of guided light 132G into guided modes of waveguide 50 can be seen on the right-hand side of the critical angle line, while coupling to leaky modes and radiation modes propagating deep into the ion-exchanged glass substrate (i.e., into bulk-glass region 14B) is observed on the left-hand side of the critical angle line.

Figure 6B:
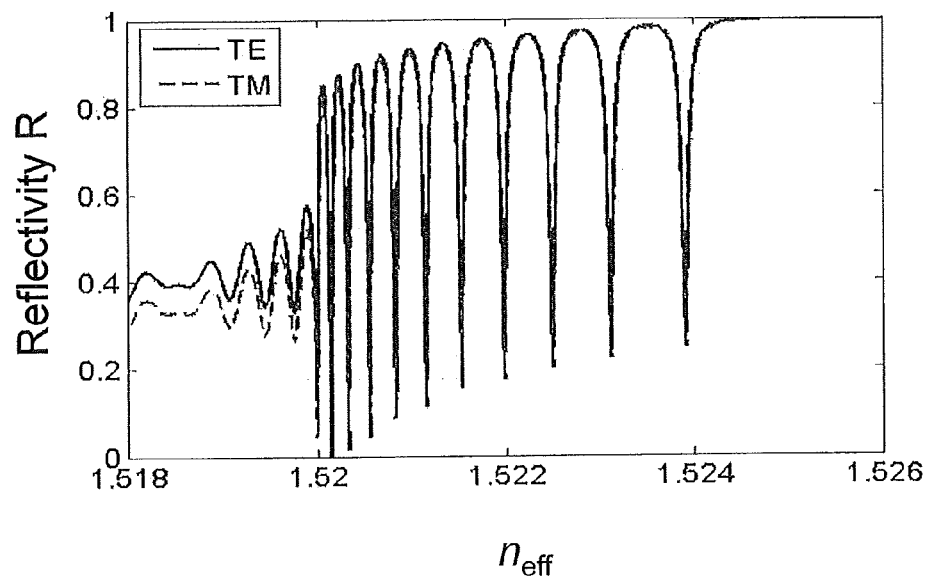
FIG. 6B is similar to FIG. 6A and shows the calculated reflection R from the prism-waveguide interface as a function of the effective index $n_{eff} = n_P \sin \theta$.

FIG. 6B is similar to FIG. 6A and shows the calculated reflection R from the prism-waveguide interface IF as a function of the effective index $n_{eff}=n_P \sin \theta$. The same coupling configuration and glass waveguide properties as in FIG. 6A were used in the modeling. Both FIG. 6A and FIG. 6B illustrate the TE and TM mode spectra represented by idealized mode lines 200 in the form of a series of intensity dips. It can be inferred from FIG. 6A and FIG. 6B that for the waveguide, substrate, and index-matching-oil parameters used in the simulation, the TE mode spectrum is nearly identical to the TM mode spectrum in the absence of birefringence.

FIG. 7A through FIG. 7C are close-up plots of reflectivity R vs. $n_{eff}$ for the first guided mode (FIG. 7A), the fifth guided mode (FIG. 7B), and the eighth and ninth guided modes (FIG. 7C) of the plot of FIG. 6B. The plots of FIG. 7A through FIG. 7C show more detail of the shape of the mode-line intensity profiles for both the TM and TE modes, with each intensity dip having a corresponding intensity extremum 202. The difference in effective index $n_{eff}$ between TE and TM modes caused by the different boundary condition at the prism-waveguide interface IF is on the order of 0.00001, and is similar for all modes. An aspect of the disclosure involves determining precise locations of the intensity extrema 202, as described in greater detail below.

Example Method of Measuring the Stress Profile

Figure 8:
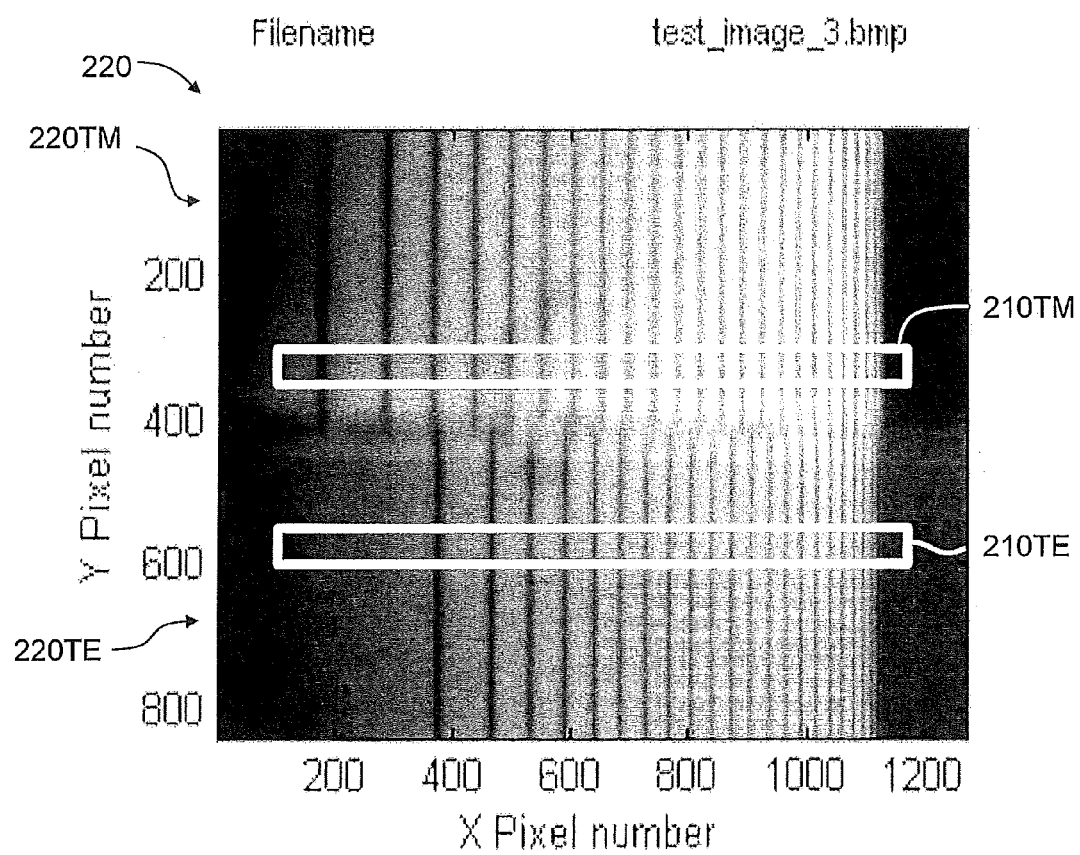
FIG. 8 is similar to FIG. 5 and is an actual image of the TM and TE mode spectra as captured by the photodetector unit, with the white boxes representing the portions of the images of the mode spectra used in carrying out the method.

As described above, an example system 100 receives in controller memory 170 at least one raw or initial image IM of the mode spectrum 220 as obtained by detecting reflected light 132R from prism-waveguide interface IF. As discussed above, raw or initial image IM includes information about the TM and TE guided modes ("eigenmodes") of waveguide 50. In an example, raw or initial image IM includes a scale factor. FIG. 8 is similar to FIG. 5 and shows an actual raw or initial image IM of the TM and TE mode spectra 220TM and 220TE as captured by the photodetector array 154.

In an example, a raw or initial image IM is selected from memory 174 for processing by processor 172. In another example, the raw or initial image is directed straight to processor 172 for processing and the results are stored in memory 174. In the description below, the various image processing steps and calculations are carried out by processor 172 unless otherwise noted.

As an initial step, raw or initial image IM is averaged to form an averaged image $IM_A$ that has reduced noise as compared to the initial or raw image IM. Such averaging can be accomplished in a number of different ways. For example, one averaging approach includes dividing up a given region 210 of initial IM into segments and then averaging the different segments. Another averaging approach that is a variation of the aforementioned approach is integrating a given region 210 along the dimension parallel to the mode lines 200TM and 200TE to form a one-dimensional averaged mode-line intensity profile. Another averaging approach is to capture a plurality of images IM and average the corresponding regions 210 in the different images. Yet another averaging approach is to select a segment of each region and perform the averaging over the region.

FIG. 5A and FIG. 8 show boxes 210TM and 210TE that respectively represent example regions of the mode spectra 220TM and 220TE used in carrying out the method, including the portions of mode lines 200TM and 200TE that are averaged. In general, when averaging is used, at least two different rows of pixels for each TM and TE guided mode (i.e., guided mode line 200TM and 200TE) are employed to obtain averaged TM and TE guided mode lines in forming averaged image $IM_A$.

Next, the averaged image $IM_A$ may be filtered, e.g., is at least one of band-pass filtered and low-pass filtered. In an example, this filtering is accomplished by a $2^{nd}$-order digital filter having a select band-pass and a select low-pass cut-off. The result is an averaged and filtered image $IM_F$. In an example, filtered image $IM_F$ is re-normalized to increase the contrast.

Next, the derivative $IM'_F$ of (optionally) filtered image $IM_F$ may be determined to obtain approximate (initial) positions of the intensity extrema 202. These positions are considered approximate or initial because the intensity profile of a given mode line may not be symmetric, in which case the zero of the derivative $IM'_F$ may not yield the best estimate of the true extremum. Nevertheless, the methods of the disclosure may use the approximate or initial extrema positions to obtain a suitable stress profile in certain cases or for certain applications.

Once the approximate or initial positions of the extrema 202 are established, a fitting routine applied to each of the mode lines 200 to fit an appropriate curve (e.g., a Gaussian or a Lorentzian) to the corresponding local intensity profile in the immediate neighborhood of the approximate (initial) intensity extremum. This is done to achieve more accurate (i.e., sub-pixel resolution or reduction of random position error due to intensity noise) positions for extrema 202 as compared to the approximate or initial positions. In an example, a DC bias may be used to facilitate the curve-fitting process.

Figure 9A:
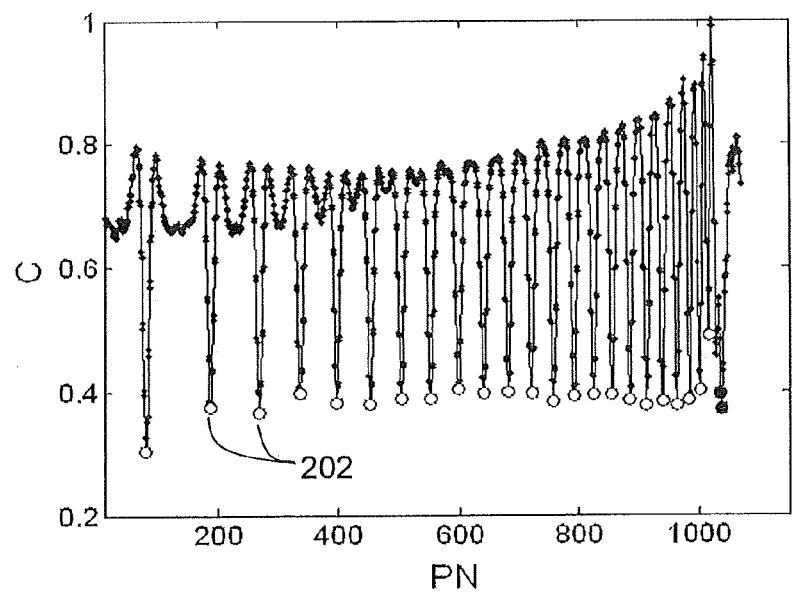
FIGS. 9A and 9B are example plots of the normalized intensity C vs. pixel number PN for the processed image IM for the TM and TE modes respectively, illustrating the automated determination of the intensity extrema of the mode lines, as indicated in the plots by white circles.
Figure 9B:
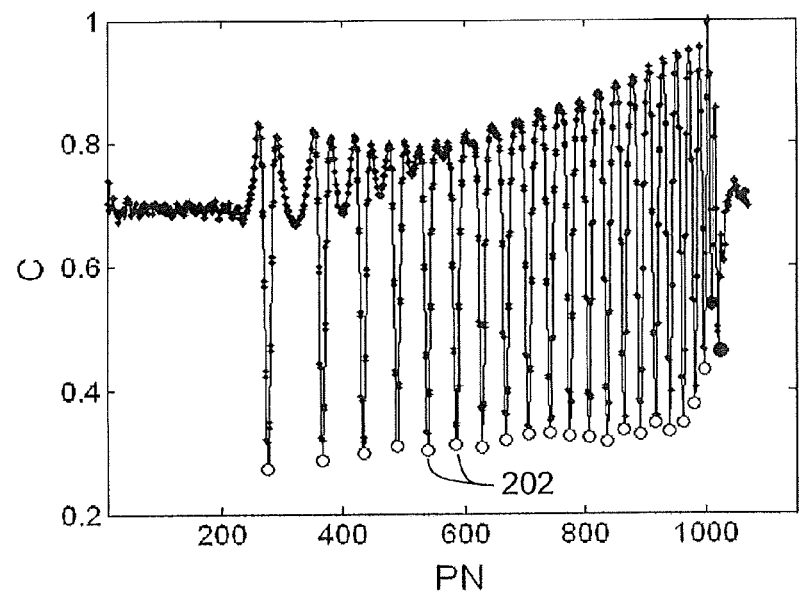

FIGS. 9A and 9B are example plots of the intensity variation or "contrast" C vs. pixel number PN for the processed image IM for the TM and TE modes respectively, illustrating the automated determination of extrema 202, which are represented by white circles. The contrast C was obtained by dividing the integrated signal processed through the high-pass filter by the integrated signal processed by the low-pass filter, and then adding a constant offset with value adequate to make all the final values C(PN) positive.

Once the intensity extrema 202 are determined to an accuracy greater than that typically achieved by the derivative calculation (e.g., to sub-pixel resolution of photodetector array 154 or with reduced position error due to intensity noise), the values of the approximated effective index $n_{eff}$ of each mode is computed via equation (3):

$$n_{eff} = n_{sub} + (pixel_0 - pixel)K/\text{scaling} \quad (3)$$

where the $n_{sub}$ is the aforementioned refractive index of the substrate (e.g., $n_{sub}$=1.52), $pixel_0$ is the pixel corresponding to the critical angle where the effective index is equal to the index of the substrate 10 (e.g., 1180), pixel is the variable, K is a parameter that is a function of the angular dispersion of coupling prism 120 (e.g., K=0.003079), and "scaling" is the number of pixels per mm (e.g. 271) in image IM. In the case of a difference of $n_{eff}$ for TE and TM modes where $n_{sub}$ and $pixel_0$ are identical in both polarizations, these parameters do not affect the computation of the birefringence. Equation 3 above is an approximation valid when the difference between $n_{eff}$ and $n_{sub}$ is relatively small. In the general case K may be a slowly varying function of incidence angle rather than constant.

Thus, in an example, approximate values for $n_{sub}$ and $pixel_0$ can be used, one for each of TE and TM polarization during the computation. Next, the value of the intensity extrema 202 (which have at this point been converted to effective refractive index values $n_{eff}$ per equation (3)) as found by the aforementioned Gaussian or another appropriate fit are fed into an inverse-WKB (IWKB) routine that computes the equivalent turning points z1, z2, . . . etc. for each effective index. An example IWKB method is described below.

Figure 10:
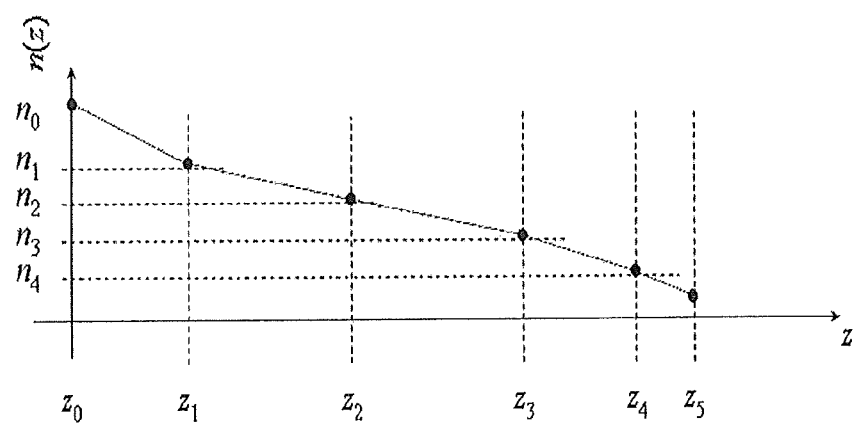
FIG. 10 is an example plot of n(z) vs. z associated with the IWKB calculation, where linear interpolation is used between neighboring turning points.

FIG. 10 sets forth an example plot of n(z) vs. z associated with the IWKB calculation. In the plot of FIG. 10, linear interpolation is used for $\underline{n}(z)$ between neighboring turning points. Note, however, other interpolations can be used between the turning points. In another example embodiment, a prescribed index profile, such as a complementary error function (erfc) profile, an exponential profile, a Gaussian profile, etc., can be recovered from the measured mode spectrum. Such a profile can then be used to perform the interpolation to obtain a better approximation to the actual index profile than a linear interpolation.

In an example, the methods of the disclosure include performing a linear stepwise WKB approximation, such as described by J. M. White and P. F. Heidrich in their publication "Optical waveguide refractive index profiles determined from measurement of mode indices: a simple analysis," Appl. Opt. 15, 151-155 (1976), which publication is incorporated by reference herein.

The WKB approximation leads to the following eigenvalue equation:

$$\int_0^{z_m} \sqrt{n^2(z) - n_m^2} \, dz = \frac{4m-1}{8}, \quad m = 1, 2, \ldots M$$

where $z_m$ are the turning points defined by $n(z_m)=n_m$, $z_0=0$, and $n_0=n(z=0)$, and M is the total number of modes. The modes here are ordered from 1 to M, rather than the usual 0 to M−1. For example, the $TE_0$ mode corresponds to m=1, the $TE_1$ mode corresponds to m=2, and so on. The above eigenvalue equation assumes that n(z) decreases monotonically with depth z and that there is a π/2 phase shift at the surface (z=0) and π/4 phase shift at $z=z_m$. The dimensionless variable z represents depth from substrate surface 22 in units of the optical wavelength λ.

To determine the values of from the values of $n_m$, the above equation can be written as a sum of integrals $$\sum_{k=1}^{m} \int_{z_{k-1}}^{z_k} \sqrt{n^2(z) - n_m^2} \, dz = \frac{4m-1}{8}$$

If n(z) is approximated with a piecewise linear function connecting the measured effective indices, $$n(z) \approx n_k + \frac{(n_{k-1} - n_k)}{(z_{k-1} - z_k)}(z_k - z) \text{ for } z_{k-1} \leq z \leq z_k,$$

and $n(z)+n_m$ is approximated by the midpoint value $n_m+0.5(n_{k-1}+n_k)$ for the same range of z, then $$z_m = z_{m-1} + \frac{3}{2}\sqrt{\frac{2}{(n_{m-1} + 3n_m)(n_{m-1} - n_m)}} \times$$

$$\left\{\left(\frac{4m-1}{8}\right) - \frac{2}{3}\sum_{k=1}^{m-1}\sqrt{\frac{n_{k-1} + n_k}{2} + n_m}\left(\frac{z_k - z_{k-1}}{n_{k-1} - n_k}\right)[(n_{k-1} - n_m)^{3/2} -$$

$$(n_k - n_m)^{3/2}]\right\} \text{ for } m = 2, 3, \ldots, M$$

and $$z_1 = \frac{9}{16}\sqrt{\frac{2}{(n_0 + 3n_1)(n_0 - n_1)}}$$

The above equations determine all turning points $z_k$, for k=1 ... M, from the effective indices $n_k$ and the surface index $n_0$. A suitable value of the surface index for index profiles obtained by diffusion in a single phase is one that minimizes the overall curvature of the profile. This is equivalent to minimizing the sum of second differences. For some steeper profiles, minimizing the sum of the areas of triangles formed by each set of three consecutive points $(n_k, z_k), (n_{k+1}, z_{k+1}), (n_{k+2}, z_{k+2})$ for k=0, 1, ... M−2 sometimes produces smoother reconstructed profiles than minimizing the sum of second differences.

Figure 11:
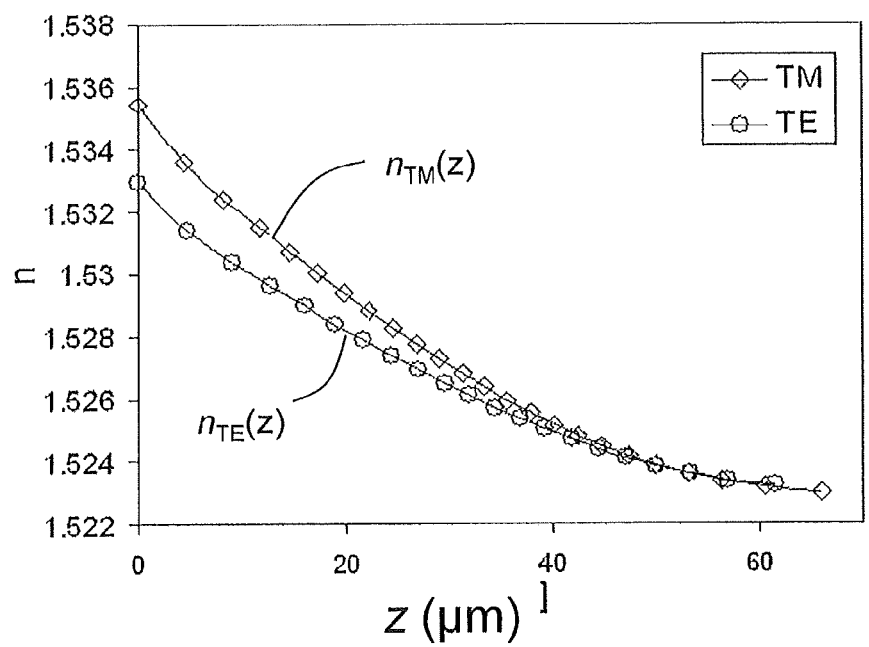
FIG. 11 is similar to FIG. 10 and shows plots of the refractive index profiles $n_{TM}(z)$ and $n_{TE}(z)$ of an actual ion exchanged sample as calculated using the IWKB method.

Next, the refractive index profiles $n_{TM}(z)$ and $n_{TE}(z)$ for the TM and TE modes are determined. FIG. 11 is similar to FIG. 10 and plots example refractive index profiles $n_{TM}(z)$ and $n_{TE}(z)$ using linear interpolation between the turning points. A change of variables has been enacted, converting the dimensionless variable z to a depth z by multiplying with the optical measurement wavelength λ.

The refractive index profiles $n_{TM}(z)$ and $n_{TE}(z)$ for the TM and TE modes are thus respectively linearly interpolated and then subtracted to obtain $\Delta n(z)=n_{TM}(z)-n_{TE}(z)$, which is a measure of the birefringence in ion-exchange region 14E of ion-exchanged glass substrate 10. The stress profile S(z) is then computed via $S(z)=\Delta n(z)/SOC$ where SOC is the stress optic coefficient.

Figure 12:
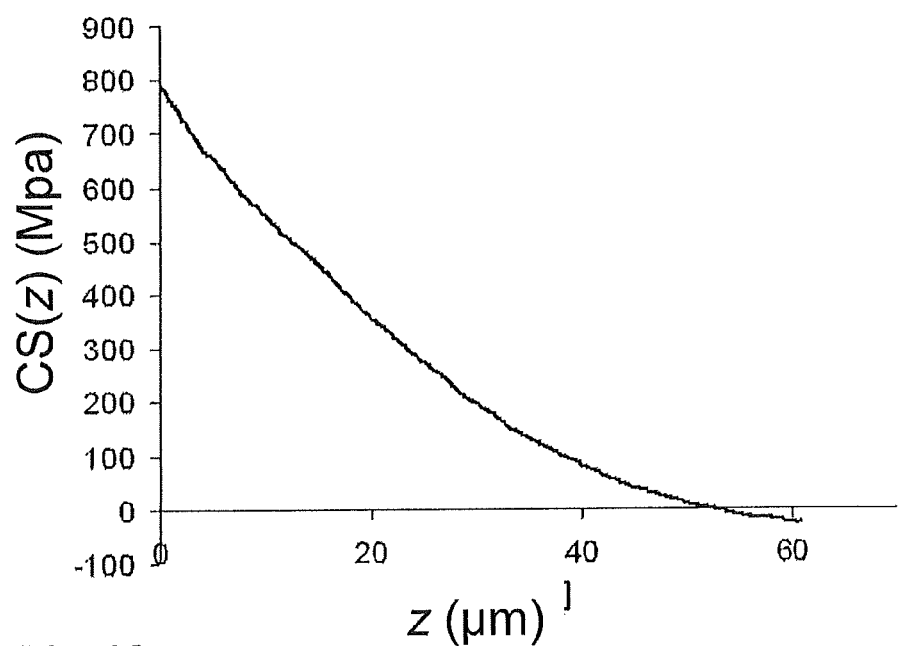
FIG. 12 is an example plot of the compressive stress profile CS(z) in units of MPa vs. position z (microns, μm) from glass substrate surface, where CS(z)=−S(z), where S(z) is the stress.

FIG. 12 is an example plot of the compressive stress profile CS(z) in units of MPa vs. position (microns or μm) from upper surface 22 of ion-exchanged glass substrate 10. The widespread convention for the definition of stress is that the stress S(z) is positive when it is tensile stress and negative when it is compressive stress. The diffusion depth of layer DOL and the case depth $z_0$ can be determined from CS(z).

Alternative Embodiments

In one alternative embodiment, after determining the spectra of effective indices $n_{eff}$ of the guided modes by the aforementioned Gaussian or other fitting process, the index profile recovery is enabled by approximating the index profile with an assumed function that depends on a number of parameters not exceeding the number of guided modes. The refractive index profile is determined by finding the values of the parameters using for example a nonlinear least-square fit of a calculated spectrum of modes for the assumed functional form to the measured spectrum of modes. This procedure can lead to valuable index profile reconstruction when the assumed functional form is a good approximation to the actual refractive index profile.

For example, the complementary error function $\text{erfc}(z/z_{eff})$ often provides a very good approximation for the refractive index increase near the upper surface 22 of ion exchanged glass substrates 10 obtained by diffusion with minimal or no subsequent annealing. Here, $z_{eff}$ stands for effective diffusion depth. In addition, an exponential function $\exp(-z/z_{eff})$ also provides a good approximation for similarly obtained ion-exchange profiles, and may even provide better approximation than $\text{erfc}(z/z_{eff})$ in some special cases of diffusion where the effective diffusion coefficient describing the ion exchange process is concentration dependent. Other examples of assumed functions include various combinations of functions such as two erfc functions (e.g., erfc1+erfc2)

The profile recovery at each polarization in this alternative example embodiment is based on the following procedure:

First, an assumed function $n(z)=f(z, a_1, \ldots a_N)$ for the depth dependence of the refractive index for a given polarization (TM or TE) is selected, where $a_1 \ldots a_N$ are N parameters of the function. Then, a least-squares fitting routine is used to find a set of values for the parameters $a_1 \ldots a_N$ that minimizes the sum over all the modes of the squares of the differences in calculated and measured effective indices for each mode. The least-squares fitting routine iterates through various sets of parameters until it finds a set that minimizes the sum of squares.

At each iteration, calculated effective indices for the modes are obtained by solving the eigenvalue wave equation $$\frac{d^2 E}{dz^2} + \left(\frac{2\pi}{\lambda}\right)^2 (n^2(z) - n_{eff}^2)E = 0,$$

for the waveguide formed by the refractive index profile determined by the assumed function f with parameter values as selected by the least-squares fitting routine for that iteration. In the above equation, λ is the optical wavelength and E is the transverse field (electric for TE modes and magnetic for TM modes).

In a related embodiment, the eigenvalue equation set forth above can be used to obtain the eigenvalues $n_{eff}$ represented by $n_m$ with m=1 ... M. These eigenvalue equations can be solved numerically using, for example, finite differences, employing the shooting method or relaxation methods that are well-known to those skilled in the art. For the fitting routine itself, a number of numerical methods for least-squares fitting are documented in the literature and can be readily applied by those skilled in the art. Some examples of fitting routines include the Levenberg-Marquardt method and the trust-region method, such as described in the book by Press et al., entitled "Numerical Recipes in C", Second edition, published by Cambridge University Press (1992).

Once the set of parameters minimizing the sum of least squares is found, then the best approximation for the profile based on the assumed function f(z) is determined by substituting the minimizing values of the parameters into the assumed function. Other assumed functions, for example, $g(\underline{z}, b_1, \ldots b_{N2})$ depending on their own sets of parameters, can also be used to approximate the refractive index profile. Least-squares fitting can be applied for such functions as well to obtain the best approximation for the profile based on the function g.

Then a best overall approximation for the refractive index profile can be found based on the full set of explored assumed functions f, g, etc., by comparing the minimized sums of squares for the various assumed functions and selecting the functional form with smallest minimized sum of squares to represent the actual refractive index profile.

Any of the members of the set of explored assumed functions may be a single basic mathematical function, such as the complementary error function $\text{erfc}(z/z_{\mathit{eff}})$, an exponential function $\exp(-z/z_{\mathit{eff}})$; a Gaussian function $\exp(-z^2/z_{\mathit{eff}}^2)$; a Fermi function $1/(\exp(z/z_{\mathit{eff}})+1)$; a more general exponential $\exp(-(z/z_{\mathit{eff}})^p)$ where p represents a positive real or rational number; a truncated parabolic function $1/z^2$; a linear decay (a−bz), etc. In addition, any of the members of the set of explored assumed functional may be a combination of basic mathematical functions such as those described above, as long as the total number of parameters defining the combination of assumed functions is smaller than the number of measured optical modes of the ion exchanged waveguide 50 at the optical polarization (TM or TE) under consideration. In an example, the total number of parameters may be further restricted to ensure convergence of the nonlinear fitting routine.

Once the best-fit TM and TE-refractive index profiles $n_{TM}(z)$ and $n_{TE}(z)$ are recovered, the stress profile S(z) is determined via the above-defined relationship S(z)=Δn(z)/SOC.

The above procedure has been applied to the experimental TM and TE spectra of a waveguide formed at the surface of a sodium-containing aluminosilicate glass substrate by ion exchange in molten potassium nitrate. The spectra were measured by the prism coupler configuration shown in FIG. 3A, and raw or initial images IM such as shown in FIG. 8A were recorded. The IWKB method was then used to determine TM and TE refractive index profiles and the compressive stress profile CS(z) for comparison. In addition, the effective mode indices $n_{\mathit{eff}}$ determined from the images $IM_{TM}$ and $IM_{TE}$ of the TM and TE spectra were fed to a nonlinear least-squares routine (specifically, the MATLAB® function nlinfit) to obtain the best-fit parameters of an assumed function erfc that best approximated the actual refractive index profile.

The assumed function f for the refractive index profile for the TM and for the TE spectra was defined by the following functional form n(z):

$$n(z) = n_{sub} + \Delta n_0 \text{erfc}\left(\frac{z}{z_{\mathit{eff}}}\right)$$

where $n_{sub}$ is the substrate index, $\Delta n_0$ is the index change (increase) at the substrate surface 22 due to ion exchange, and $z_{\mathit{eff}}$ is a parameter representing an effective penetration depth of the profile. The parameters $n_{sub}$, $\Delta n_0$, and $z_{\mathit{eff}}$ were allowed to vary by the nonlinear least-squares routine during the fitting for each of the TM and TE spectra. An independent variable (x) was used in the nonlinear least-squares routine to represent the integer mode number ranging from 1 to 21 for the 21-TM modes and from 1 to 19 for the 19 TE-modes. A response-variable (y) was used to represent the effective index $n_{\mathit{eff}}$ for each of the 21 TM-modes or 19 TE-modes.

During each iteration, the fitting routine called upon a 1-dimensional mode solver that sought to determine the mode spectrum of a waveguide with a given index profile by using the shooting method. The mode solver used a uniform mesh with a point spacing of 0.25 μm within a 100 μm wide calculation window, including a 2 μm wide air region with n=1 above substrate upper surface 22. The wavelength λ was 0.589 μm.

During each iteration, the mode-solver was called to find as many modes as the corresponding experimental spectrum contained, and no more. If during an iteration the mode solver found fewer modes than contained in the experimental spectrum, the rest of the modes were assigned an effective index equal to the substrate index $n_{sub}$ for the purpose of determination of the sum of squared differences by the least-squares routine.

Figure 13:
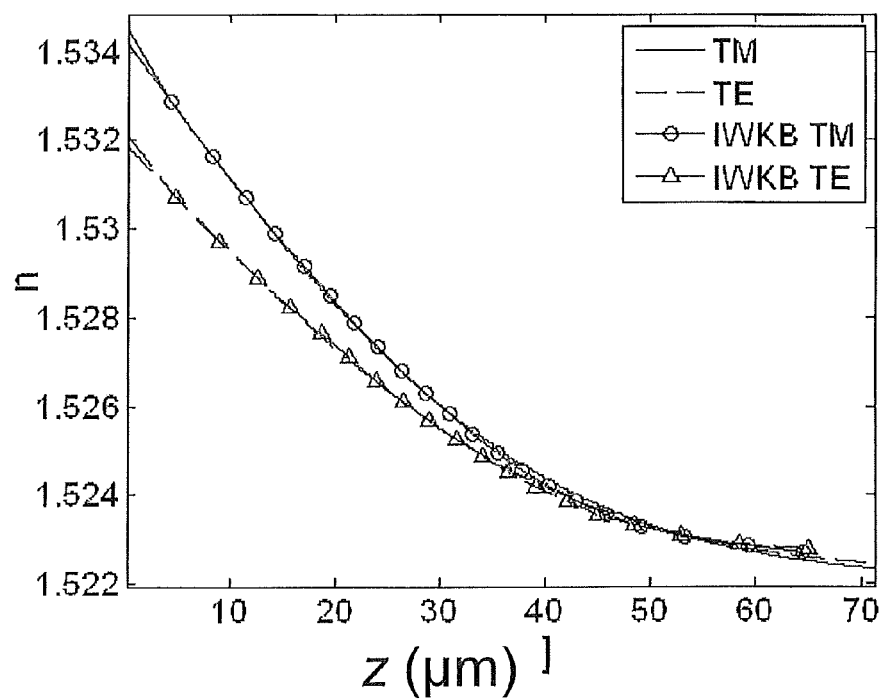
FIG. 13 is a comparison plot of the TM- and TE-index profiles $n_{TM}(z)$ and $n_{TE}(z)$ obtained from the mode spectra by the fitting method using erfc-function for the assumed index profile, and by the IWKB method FIG. 14 plots the stress profile S(z) vs distance (microns, μm) obtained from the difference of the recovered TM- and TB-profiles as fitted with the erfc function (solid-line curve), along with the stress profile S(z) obtained from the difference of the IWKB TM- and TE-profiles (dashed-line curve)

FIG. 13 is a plot similar to FIG. 11 and shows the result of the recovery procedure for the TM and TE refractive index profiles $n_{TM}(z)$ (solid line) and $n_{TE}(z)$ (dashed line). For comparison, the IWKB-calculated TM refractive index profile is shown by circles connected with continuous lines, and the IWKB-calculated TE refractive index profile is shown with triangles connected by dashed lines. It is clear from the small difference between the refractive index profiles obtained by the IWKB method and by the fitting method that for this experimental waveguide the refractive index profile recovery obtained by least-squares nonlinear fitting of the profile with an erfc-function would be considered more than adequate for most applications.

Figure 14:
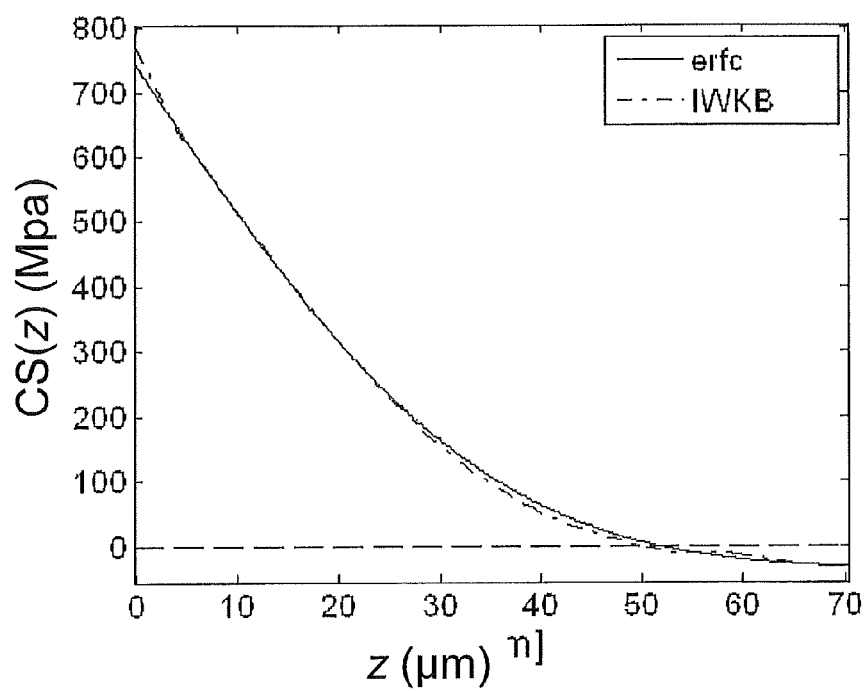

FIG. 14 plots the compressive stress profile CS(z) obtained from the difference of the recovered TM- and TE refractive index profiles $n_{TM}(z)$ and $n_{TE}(z)$ as fitted with the erfc-function (solid line), along with the IWKB-calculated compressive stress profile CS(z) (dot-dashed line). The agreement between the two stress profiles is excellent.

Determining Additional Stress-Related Parameters

The methods disclosed herein optionally include calculating from the stress profile S(z) at least one additional stress-related parameter, such as the compressive surface stress CS(0) or simply CS, the estimated center tension CT, the integral of the stress near the surface up to a depth equal to $z_0$, the integral of the squared stress near the surface up to a depth equal to $z_0$, and the integral of the squared stress inside the glass beyond $z_0$. These calculations are now described below.

It is known that the area under the stress curve integrated over the entire thickness of the glass should be zero for ion-exchanged glass substrates 10. This is known as the force balance condition. By computing the area under the compressive stress region from 0 to $z_0$, this area can be equated to the approximate stress-depth area equal to the product of center tensile stress (CT) and the difference 0.5TH−$z_0$, where TH is the glass substrate thickness. This allows for computing the approximate center tension CT in the center of substrate body 14 of ion-exchanged substrate 10.

Moreover, the integral of the squared stress over the length of the regions under compressive stress (0 to $z_0$) and tension ($z_0$ to glass thickness-$z_0$) can be computed. The center tension CT depends on the glass thickness TH in the computation. Therefore one should have a good idea of the glass thickness values for accurate results, as shown below.

$$\text{Stress\_surf\_integral} = \int_0^{z_0} \sigma^2 \, dx$$

-continued $$\text{Stress\_center\_integral} = \int_{z_0}^{thickness-z_0} \sigma^2 \, dx$$

The integral of the squared stress values gives a possible surrogate to detect frangibility limits in glass, defining limits in the way the glass will break under external forces.

In an example where one or some of the higher-order mode lines 200 are poorly defined and noisy, at least one of the higher-order modes is omitted from the calculations. This allows the methods disclosed herein to employ only those mode lines 200 that can be determined accurately enough to allow reproduction of the stress profile and related stress parameters with a certain level of accuracy. For example, during the stress-profile recovery illustrated in FIG. 11 and FIG. 12, two highest-order TM and two highest-order TE modes indicated by black dots in FIG. 9A and FIG. 9B were omitted. In some cases, care must be taken in counting if the omitted mode is not the highest-order of the residual set of modes.

TE-Mode IWKB Embodiment

In one aspect of the method, an IWKB procedure designed for the TE-mode is applied to extract the refractive index profiles n(z) affecting the propagation of both the TE and TM modes in the planar waveguide layer 50. The difference between the TE and TM refractive index profiles Δn(z) determines the stress profile S(z) via the stress-optic coefficient SOC per above.

It has been determined through modeling that for typical ion-exchange waveguides in glass, the systematic error introduced by applying a TE-mode-IWKB procedure to TM-waves is small enough that its effect on the recovered stress profiles S(z) can be considered negligible. A computer simulation was carried out that assumed no stress-induced birefringence in waveguide 50, so that both the TE and the TM modes experienced the same material refractive index. A coupling prism 120 with refractive index $n_P$ was part of the simulation, and an index-matching fluid 128 having refractive index $n_F$ intermediate between $n_{sub}$ and $n_P$ was used in the simulation. It was found that the effective index $n_{eff}$ of each TM-mode differed from that of the corresponding TE-mode by less than 0.00001. This value is on the order of 1% of the typical stress-induced birefringence S(z) in actual waveguides. This error produces a correspondingly small error in the stress profile calculation. Such a small error is anticipated to be acceptable in most situations.

Error Correction Embodiment

In another embodiment of the method, a typical TM-IWKB-profile error due to neglect of the difference between TE and TM modes is estimated numerically as described in the previous paragraph and corrected for by subtracting it from the TM-IWKB-profile (calculated by using the simple IWKB designed for TE-modes) prior to estimation of the stress profile. This method should produce a more accurate reconstruction of the stress profile S(z).

In the plots of R vs. $n_{eff}$ shown in FIG. 6B and FIGS. 7A through 7C, each of the TM-modes has slightly higher effective index (by about 0.00001) than the corresponding TE-mode in the presence of index-matching fluids with $n_F > n_{sub}$. If the TE-IWKB method is applied to these measured modes for reconstructing the TM refractive index profile, the profile will appear higher in effective index by about 0.00001 than it actually is. By subtracting a properly reconstructed TE-IWKB profile, a slightly higher birefringence (on the order of 1% higher) is calculated. Since the amount of shift relative to the birefringence-free simulation is approximately known, if the estimated effective shift for each of the TM modes is subtracted from its associated effective index value, the error can be reduced or eliminated to obtain a more accurate stress profile.

Alternatively, since the shift for all TM modes is approximately the same, the average TM index shift can be divided by the stress-optic coefficient and the value (on the order of 1% of typical peak stress in the above example) subtracted from the calculated stress profile.

It will be appreciated by one skilled in the art that an IWKB routine designed for TM modes can be developed and used for TM-index profile reconstruction, and the standard routine designed for TE modes can be used for TE-mode profile reconstruction. While such a method could be considered most appropriate, it would still be only an approximation, since the IWKB method is itself an approximation. Hence, such a method may not necessarily produce accuracy improvement beyond the implementations described above.

It is also noted that the IWKB method need not be based on linear interpolation between the mode turning points. In examples, other methods of interpolation—each suitable for a particular type of refractive index profile—are employed. For example, cubic or higher-order polynomial, or even rational functions, can be used as the interpolation function within sets of several consecutive guided modes.

In one embodiment of the IWKB method for stress profile characterization disclosed herein, the interpolation function for the mode turning points can be a sum of a complementary error function and a small correction in the form of a polynomial, a rational function, or a combination thereof. This embodiment is particularly well suited for characterizing waveguides formed by ion exchange without subsequent annealing. Similarly, an embodiment in which the recovered index profile is represented by an exponential function is well suited for characterizing many ion-exchange waveguides with minimal or no subsequent annealing.

In one embodiment, the IWKB method as applied on the TE and TM modes uses interpolation on an array of depths that shares the same depths for TE and TM modes. If one of the refractive index profiles has a turning point of the highest-order mode deeper than that of the turning point of the highest-order mode of the other, the array of depths may extended over the difference with appropriate extrapolation of the profile with shallower highest-order-mode turning point. Using a common set of depths for TE and TM modes during IWKB interpolation may reduce numerical error in the stress profile.

Figure 15:
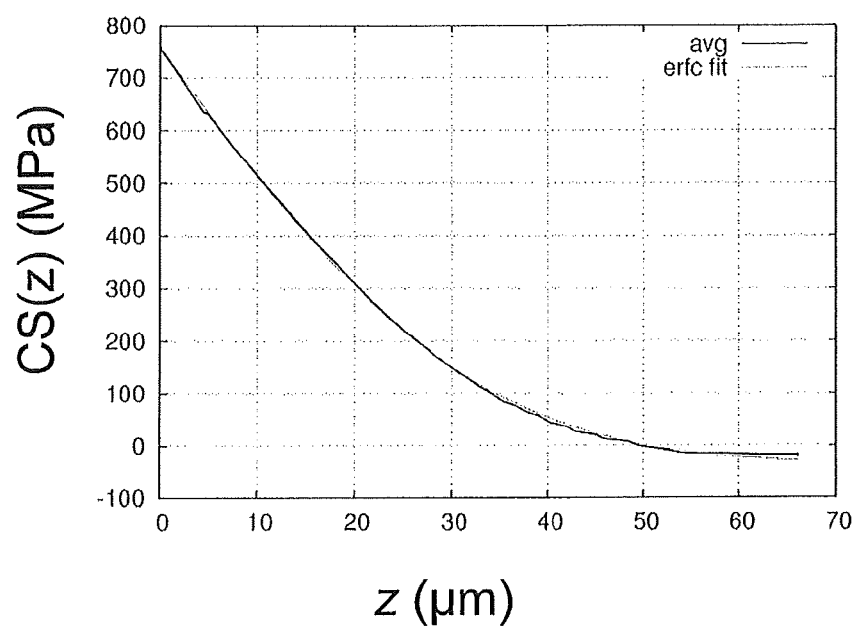
FIG. 15 plots the stress profile S(z) in MPa obtained using the IWKB method vs. distance z (microns, μm), with the stress profile fitted to complementary error function erfc(z) with constant offset to find deviations due to non-linear diffusivity.

In an example illustrated in the plot of FIG. 15, the compressive stress profile CS(z) can be fitted to complementary error function erfc(z) with constant offset to find deviations due to non-linear diffusivity.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A method of measuring a stress profile of an ion-exchanged glass substrate based on TM and TE guided mode spectra from an optical waveguide defined in part by an ion-exchange region, the method comprising:
   digitally defining from the TM and TE guided mode spectra respective TM and TE intensity profiles corresponding to TM and TE guided modes, including:

a) coupling light into the optical waveguide through a coupling prism optically coupled to the optical waveguide to define a prism-waveguide interface;

b) reflecting light from the prism-waveguide interface, the reflected light representative of the TM and TE guided mode spectra; and c) detecting the reflected light with a photodetector array;

determining positions of intensity extrema of the TM and TE intensity profiles;

calculating respective TM and TE effective refractive indices from the positions;

calculating TM and TE refractive index profiles $n_{TM}(z)$ and $n_{TE}(z)$ where z is a distance from a substrate surface by performing one of a) an inverse WKB calculation based on the TM and TE effective refractive indices, or b) fitting calculated guided mode spectra to the TM and TE guided mode spectra using one or more respective assumed functions for $n_{TM}(z)$ and $n_{TE}(z)$; and calculating the stress profile $S(z)=[n_{TM}(z)-n_{TE}(z)]/SOC$, where SOC is a stress optic coefficient for the glass substrate.

2. The method according to claim 1, further comprising:
determining initial positions of the intensity extrema of the TM and TE intensity profiles; and
applying curve-fitting to the TM and TE intensity profiles, including the initial intensity extrema positions, to establish the intensity extrema positions.

3. The method according to claim 2, further comprising:
digitally defining the TM and TE guided mode spectra including imaging of light representative of the TM and TE guided mode spectra onto a photodetector having pixels with a pixel size; and
performing the curve-fitting to determine the positions of the TM and TE intensity extrema with a resolution smaller than the pixel size.

4. The method according to claim 1, further comprising noise-averaging the TM and TE intensity profiles.

5. The method according to claim 1, further comprising performing at least one of low-pass and band-pass filtering of the TM and TE guided mode spectra.

6. The method according to claim 1, further comprising one of a) providing the light to the coupling prism by scanning the light through a range of angles relative to a surface normal of the coupling prism and b) providing the light to the coupling prism as one or more convergent light beams without scanning the convergent light beams.

7. The method according to claim 1, further comprising calculating from the stress profile $S(z)$ at least one of the following:
a compressive surface stress $CS(\mathbf{0})$;
an estimated center tension CT;
an integral of the stress; and
an integral of the squared stress.

8. The method according to claim 1, further comprising the intensity extrema being intensity minima.

9. A method of measuring a stress profile formed in an ion-exchanged glass substrate having a surface and a stress optic coefficient SOC, comprising:
digitally capturing TM and TE guided mode spectra of an optical waveguide defined by the ion-exchanged glass substrate, including performing said digitally capturing the TM and TE guided mode spectra by imaging light representative of the TM and TE guided mode spectra onto a photodetector having pixels with a pixel size, and wherein the curve-fitting includes determining the positions of the TM and TE intensity extrema with a resolution smaller than the pixel size;

determining positions of intensity extrema of the TM and TE guided mode spectra by applying curve-fitting to portions of the TM and TE guided mode spectra to establish the respective TM and TE intensity extrema;

calculating respective TM and TE effective refractive indices from the positions;

calculating TM and TE refractive index profiles $n_{TM}(z)$ and $n_{TE}(z)$ where z is a distance from the substrate surface by performing one of a) an inverse WKB calculation based on TM and TE effective refractive indices, respectively, or b) fitting calculated guided mode spectra to the TM and TE guided mode spectra using one or more assumed functions for $n_{TM}(z)$ and $n_{TE}(z)$; and calculating the stress profile $S(z)=[n_{TM}(z)-n_{TE}(z)]/SOC$.

10. The method according to claim 9, further comprising noise-averaging at least portions the TM and TE guided mode spectra.

11. The method according to claim 9, further comprising performing at least one of low-pass and band-pass filtering of the TM and TE guided mode spectra.

12. The method according to claim 9, further comprising:
optically contacting a prism to the glass substrate surface to form a prism-waveguide interface;
coupling TM and TE light into the optical waveguide through the prism-waveguide interface as respective TM and TE guided modes while reflecting a portion of the TM and TE light from the prism-waveguide interface, wherein the reflected light is representative of the TM and TE guided mode spectra.

13. A system for measuring a stress profile of an ion-exchanged glass substrate having a surface, a stress optic coefficient SOC and an ion-exchange region that in part defines an optical waveguide, comprising:
a photodetector array having an array of pixels and configured to detect light representative of TM and TE guided mode spectra of the optical waveguide and form therefrom a digital representation of the TM and TE guided mode spectra;
a controller configured to receive the digital representation of the TM and TE guided mode spectra, the controller having instructions stored in a computer-readable medium that cause the controller to carry out the following calculation to calculate the positions of intensity extrema in the TM and TE guided mode spectra to sub-pixel resolution:
determine positions of intensity extrema in the TM and TE guided mode spectra;
calculate respective TM and TE effective refractive indices from the positions;
calculate, from the TM and TE effective refractive indices, TM and TE refractive index profiles $n_{TM}(z)$ and $n_{TE}(z)$, where z is a distance from the substrate surface, either by performing an inverse WKB calculation or by fitting calculated guided mode spectra to the TM and TE guided mode spectra using one or more assumed functions for $n_{TM}(z)$ and $n_{TE}(z)$; and
calculate the stress profile $S(z)=[n_{TM}(z)-n_{TE}(z)]/SOC$.

14. The system according to claim 13, further comprising:
a light source unit configured to generate light;
a prism coupler assembly having a coupling prism optically contacted to the upper surface of the ion-exchanged glass substrate to define a prism-waveguide interface;

a photodetector unit that includes the photodetector array; and the prism coupler assembly being operably arranged relative to the light source unit and the photodetector unit to receive the light from the light source unit at the prism-waveguide interface and form therefrom reflected light, the reflect light being representative of TM and TE guided mode spectra of the optical waveguide.

15. The system according to claim 14, further comprising: the photodetector unit including first and second polarizers having orthogonal polarizations and configured so that first and second portions of the reflected light respectively pass through the first and second polarizers to define respective TM and TE regions on the photodetector array corresponding to the TM and the TE guided mode spectra.

16. The system according to claim 13, wherein the light source unit and the photodetector unit are moveable relative to the prism coupler assembly.

\* \* \* \* \*